(12) United States Patent
Lee et al.

(10) Patent No.: US 9,293,976 B2
(45) Date of Patent: Mar. 22, 2016

(54) STEPPING MOTOR AND SYSTEM THEREOF

(71) Applicant: SAMSUNG ELECTRONICS CO., LTD., Suwon-si, Gyeonggi-do (KR)

(72) Inventors: Kun-woo Lee, Suwon-si (KR); Jae-kyu Shim, Ansan-si (KR); Woo-jong Cho, Suwon-si (KR); Bon-min Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/291,220

(22) Filed: May 30, 2014

(65) Prior Publication Data

US 2015/0077033 A1  Mar. 19, 2015

(30) Foreign Application Priority Data

Sep. 17, 2013  (KR) .................. 10-2013-0112164

(51) Int. Cl.
*H02K 37/00* (2006.01)
*H02K 37/14* (2006.01)
*H02K 11/00* (2006.01)
*H02P 8/38* (2006.01)

(52) U.S. Cl.
CPC ............ *H02K 37/00* (2013.01); *H02K 11/0021* (2013.01); *H02K 37/14* (2013.01); *H02P 8/38* (2013.01)

(58) Field of Classification Search
CPC ....................................................... H02K 37/00
USPC .................................. 318/696, 685, 671, 560
See application file for complete search history.

(56) References Cited

U.S. PATENT DOCUMENTS

| 4,734,631 A | * | 3/1988 | Kamikura et al. ............ 318/685 |
| 5,990,651 A | * | 11/1999 | Iwazawa et al. .............. 318/685 |
| 8,278,851 B2 | * | 10/2012 | Kiyamura ................. H02P 6/14 |
| | | | 318/400.11 |

* cited by examiner

*Primary Examiner* — David S Luo
(74) *Attorney, Agent, or Firm* — Drinker Biddle & Reath LLP

(57) ABSTRACT

A stepping motor includes a housing, a stator assembly, a rotor, and a sensor portion. The stator assembly is disposed inside the housing. The rotor is rotatably disposed inside the stator assembly and includes a rotation shaft, and opposite ends of the rotation shaft are supported by the housing. The sensor portion is disposed inside the housing and detects a magnetic field of the rotor.

14 Claims, 13 Drawing Sheets

STEPPING MOTOR AND SYSTEM THEREOF

CROSS-REFERENCE TO RELATED APPLICATIONS

This application claims the priority benefit under 35 U.S.C. §119(a) from Korean Patent Application No. 10-2013-0112164 filed Sep. 17, 2013 in the Korean Intellectual Property Office, the disclosure of which is incorporated herein by reference in its entirety.

BACKGROUND

1. Field

The present disclosure relates to a stepping motor. More particularly, the present disclosure relates to a stepping motor and a stepping motor system that can detect a step-out phenomenon by using a sensor disposed inside a housing.

2. Related Art

Stepping motors have widely been used in various fields due to their simple structures and ease of control.

In the case of a camera, a stepping motor is often used as an auto focus actuator.

Such stepping motor is generally composed of a rotor that is a permanent magnet attached to a rotation shaft and rotates, and a stator that is an electromagnet fixed to the outside of the rotor. When a pulse current flows through a coil wound around the stator, a magnetic force is generated based on Fleming's left hand rule, and the polarity of the stator is repeatedly changed so that the rotor is turned by an attraction force between N and S poles acting between the rotor and the stator.

The stepping motor does not need a feedback control so that control of the stepping motor is simple. However, the stepping motor is weak to the inertial load and, when the stepping motor is driven at high load and high speed, a step-out phenomenon may occur. Accordingly, stepping motors to which a sensor portion is added to detect the step-out phenomenon when the stepping motor is driven have been developed. For example, if an optical encoder or a magnetic encoder is provided on the outside of the stepping motor, the step-out phenomenon of the stepping motor may be detected by a change in an output signal of the encoder.

However, there is a problem that, when an optical encoder or a magnetic encoder is attached to the stepping motor, a total size of the stepping motor becomes large due to the size of the optical encoder or the magnetic encoder attached to the outside of the stepping motor. In this case, the size of a device using the stepping motor, for example, a camera, is also increased. Furthermore, there is a problem that the cost of the stepping motor is increased due to the price of the optical encoder or the magnetic encoder.

SUMMARY

The present disclosure has been developed in order to overcome the above drawbacks and other problems associated with the conventional arrangement. An aspect of the present disclosure is related to a stepping motor and a stepping motor system that are small in size and have a low material cost compared to the conventional stepping motor that uses an optical encoder or a magnetic encoder, by configuring the stepping motor and the stepping motor system to detect a step-out phenomenon by installing a sensor portion capable of detecting a magnetic force inside a housing.

The above aspect and/or other feature of the present disclosure can substantially be achieved by providing a stepping motor, which may include a housing, a stator assembly, a rotor, and a sensor portion. The stator assembly is disposed inside the housing. The rotor is rotatably disposed inside the stator assembly and includes a rotation shaft, and opposite ends of the rotation shaft are supported by the housing. The sensor portion is disposed inside the housing and detects a magnetic field of the rotor.

The sensor portion may include a magneto resistive sensor.

The magneto resistive sensor may be disposed above a top end of the rotor.

The magneto resistive sensor may be disposed at a position that is spaced apart from the top end of the rotor, where the position is at an intersection of a center line of an upper pole piece of an upper yoke of the stator assembly, a straight line passing through a center of the rotor, and a tangent line of an outer diameter of the rotor.

The rotor may include an upper rotor disposed on the rotation shaft and a lower rotor that is spaced apart from the upper rotor and is disposed on the rotation shaft coaxially with the upper rotor, and the magneto resistive sensor may be disposed in a space between the upper rotor and the lower rotor.

The sensor portion may include two magneto resistive sensors that are arranged with a 90 degree phase difference.

The sensor portion may include a support portion to support the magneto resistive sensor.

The sensor portion may include a Hall sensor.

The sensor portion may include a flexible printed circuit board that is arranged to be spaced apart from an outer circumferential surface of the rotor and to surround the rotor, and the flexible printed circuit board has formed thereon a frequency generating pattern.

The sensor portion may include a disc-like printed circuit board that is arranged to be spaced apart from a top end of the rotor, and the printed circuit board has formed thereon a frequency generating pattern.

According to another embodiment, a stepping motor system may include a stepping motor and a controller configured to control the stepping motor. The stepping motor may include a housing, a stator assembly, a rotor, and a sensor portion. The stator assembly is disposed inside the housing. The rotor is rotatably disposed inside the stator assembly and includes a rotation shaft, and opposite ends of the rotation shaft are supported by the housing. The sensor portion is disposed inside the housing and detects a magnetic field of the rotor. The controller may include a step-out determination unit configured to determine whether a step-out phenomenon of the stepping motor has occurred by receiving a signal from the sensor portion, and a driving unit configured to drive the stepping motor.

When the step-out determination unit detects a step-out phenomenon of the stepping motor, the controller may control the driving unit to increase a driving force of the stepping motor.

Other objectives, advantages and salient features of the present disclosure will become apparent from the following detailed description, which, taken in conjunction with the attached drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased to assist in a comprehensive understanding.

Figure 1:
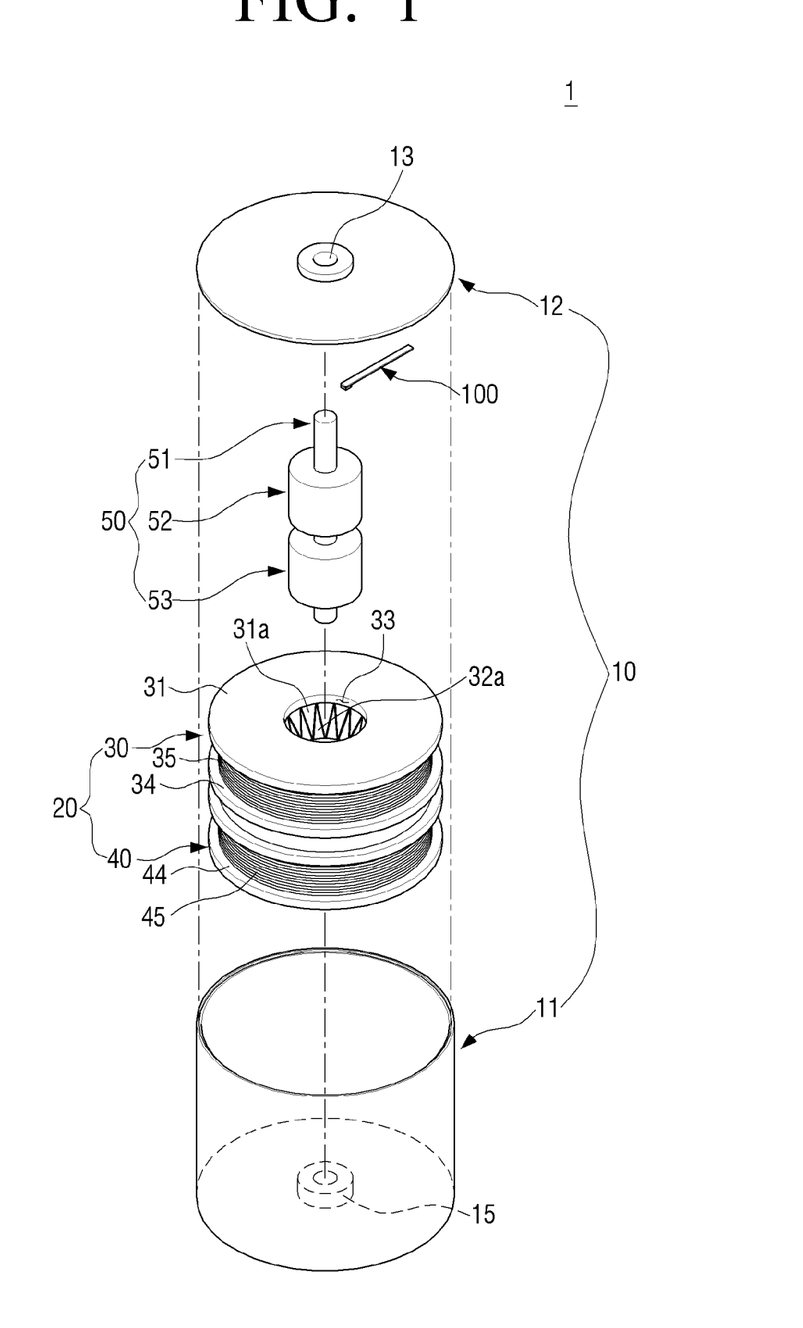
FIG. 1 is an exploded perspective view schematically illustrating a stepping motor, according to an embodiment of the present disclosure.
Figure 2A:
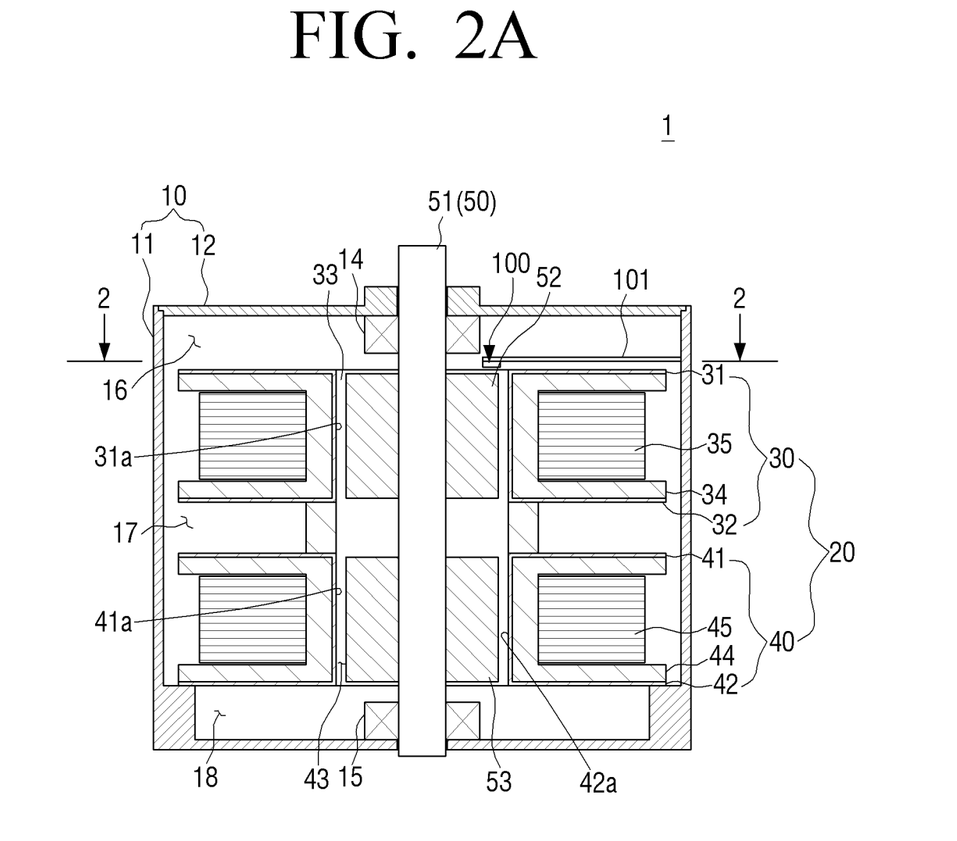
FIG. 2A is a cross-sectional view schematically illustrating a stepping motor, according to an embodiment of the present disclosure.
Figure 2B:
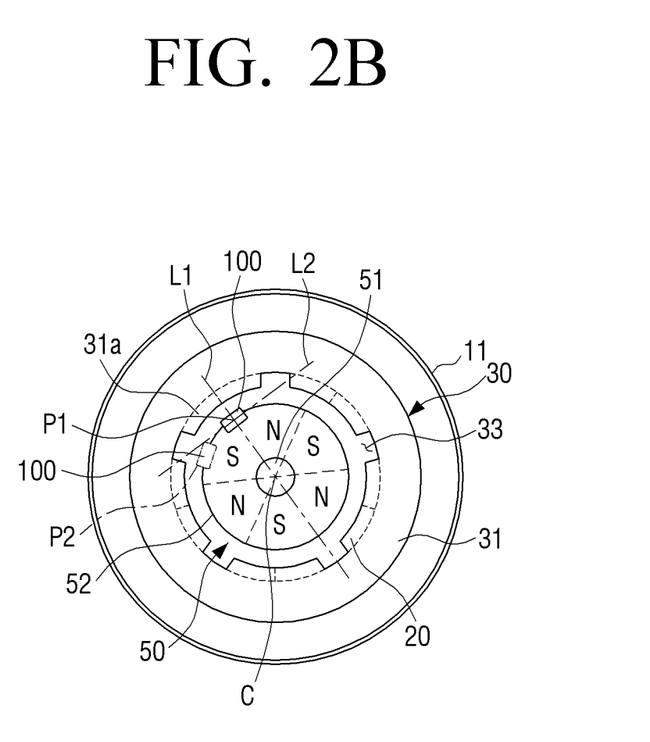
FIG. 2B is a cross-sectional view illustrating the stepping motor of FIG. 2A taken along a line 2-2 in FIG. 2A.
Figure 2C:
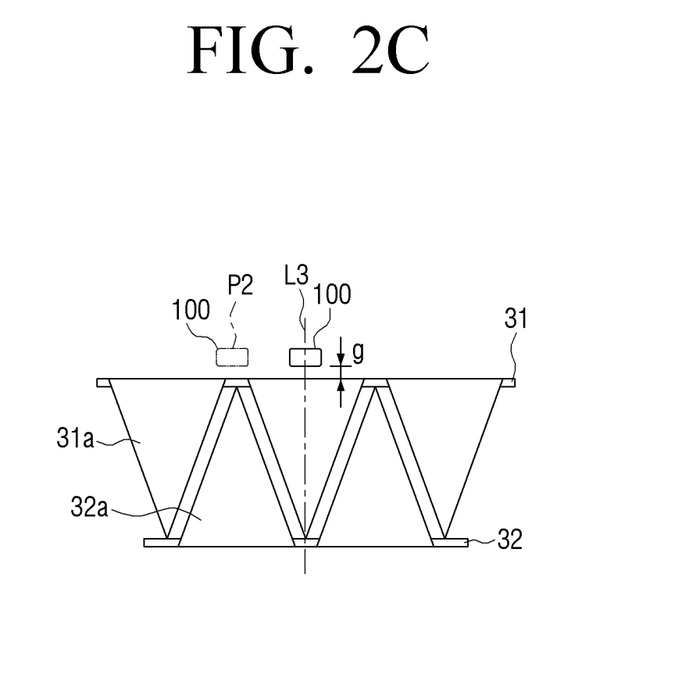
FIG. 2C is a diagram illustrating an optimum installation position of a MR sensor in the stepping motor of FIG. 2A.

FIG. 1 is an exploded perspective view schematically illustrating a stepping motor, according to an embodiment of the present disclosure. FIG. 2A is a cross-sectional view schematically illustrating a stepping motor, according to an embodiment of the present disclosure, FIG. 2B is a cross-sectional view illustrating the stepping motor of FIG. 2A taken along a line 2-2 in FIG. 2A, and FIG. 2C is a diagram illustrating an optimum installation position of a MR sensor in the stepping motor of FIG. 2A.

Referring to FIGS. 1, 2A, 2B, and 2C, a stepping motor 1 according to an embodiment of the present disclosure a housing 10, a stator assembly 20, a rotor 50, and a sensor portion 100.

The housing 10 forms the appearance of the stepping motor 1, and may be formed in a hollow cylindrical shape or a hollow rectangular parallelepiped shape. In the case of the present embodiment, the housing 10 of the hollow cylindrical shape will be explained as an example.

The housing 10 includes a housing body 11 inside which the stator assembly 20 is disposed and a housing cover 12 connected to the housing body 11. The housing body 11 is formed as a hollow cylinder with an open top end. A lower bearing 15 for rotatably supporting a rotation shaft 51 of the rotor 50 is provided in a center of a bottom surface of the housing body 11. The housing cover 12 is connected to the top end of the housing body 11, and a shaft hole 13 through which the rotation shaft 51 of the rotor 50 passes is formed in the housing cover 12. An upper bearing 14 for rotatably supporting the rotation shaft 51 of the rotor 50 is disposed on a surface of housing cover 12 and is concentric with the shaft hole 13.

The stator assembly 20 is an electromagnet formed by wound coils, and is disposed inside the housing 10, specifically, the housing body 11. The stator assembly 20 may include an upper stator 30 and a lower stator 40.

The upper stator 30 includes a bobbin 34, a yoke 31 and 32, and a coil 35. The bobbin 34 forms a space inside which the coil 35 is wound. A rotor hole 33 in which the rotor 50 is disposed is provided in a center of the bobbin 34. The yoke 31 and 32 include an upper yoke 31 having a plurality of upper pole pieces 31a that is inserted from a top surface of the bobbin 34 into the rotor hole 33, and a lower yoke 32 having a plurality of lower pole pieces 32a that is inserted from a bottom surface of the bobbin 34 into the rotor hole 33 and is placed between the plurality of upper pole pieces 31a. The upper pole pieces 31a of the upper yoke 31 and the lower pole pieces 32a of the lower yoke 32 are formed in a saw-tooth shape or in a triangular shape as illustrated in FIG. 2C so that they are arranged to engage each other on an inner surface of the rotor hole 33 of the bobbin 34.

The lower stator 40 is disposed below the upper stator 30, and includes a bobbin 44, a yoke 41 and 42, and a coil 45 in the same way as the upper stator 30. The bobbin 44, the yoke 41 and 42, and the coil 45 configuring the lower stator 40 are the same as the bobbin 34, the yokes 31 and 32, and the coil 35 configuring the upper stator 30; therefore, detailed descriptions thereof will be omitted.

The rotor 50 is rotatably disposed at a center of the stator assembly 20, and opposite ends of the rotor 50 are supported by the housing 10. In detail, the rotor 50 is rotatably disposed in the rotor holes 33 and 43 that are respectively formed in the bobbin 34 of the upper stator 30 and the bobbin 44 of the lower stator 40 configuring the stator assembly 20. The rotor 50 includes a rotation shaft 51, and an upper rotor 52 and a lower rotor 53 disposed coaxially with the rotation shaft 51.

The upper rotor 52 and the lower rotor 53 are formed in a cylindrical shape, respectively, and are disposed on the rotation shaft 51 to be spaced a predetermined distance apart from each other. Each of the upper rotor 52 and the lower rotor 53 may be formed of a permanent magnet. The permanent magnet forming each of the upper rotor 52 and the lower rotor 53 is magnetized so that a plurality of N-poles and S-poles is formed alternately as illustrated in FIG. 2B.

A first end of the rotation shaft 51 is rotatably supported by the lower bearing 15 that is provided on the bottom surface of the housing body 11, and a second end of the rotation shaft 51 is inserted in the shaft hole 13 of the housing cover 12 so as to be protruded to the outside of the housing cover 12. Also, the second end of the rotation shaft 51 is rotatably supported by the upper bearing 14 that is provided on the inner surface of the housing cover 12. Accordingly, the rotor 50 can freely rotate in the rotor holes 33 and 43 of the stator assembly 20. At this time, the rotor 50 is rotated in a state in which the upper rotor 52 of the rotor 50 faces the upper stator 30 of the stator assembly 20 and the lower rotor 53 of the rotor 50 faces the lower stator 40 of the stator assembly 20. In detail, the upper rotor 52 is rotated in a state in which the upper rotor 52 faces the plurality of upper pole pieces 31a and lower pole pieces 32a provided in the rotor hole 33 of the upper stator 30, and the lower rotor 53 is rotated in a state in which the lower rotor 53 faces the plurality of upper pole pieces 41a and lower pole pieces 42a provided in the rotor hole 43 of the lower stator 40.

Due to the structure as described above, when a pulse driving signal is applied to the coils 35 and 45 of the upper stator 30 and the lower stator 40 from an external controller 400 (see FIG. 8), the plurality of upper and lower pole pieces 31a and 32a of the yokes 31 and 32 of the upper stator 30 and the plurality of upper and lower pole pieces 41a and 42a of the yokes 41 and 42 of the lower stator 40 are alternately magnetized to different poles so as to generate an attractive force and a repulsive force between the permanent magnets configuring the upper rotor 52 and the lower rotor 53 of the rotor 50 to rotate the rotor 50.

Figure 3:
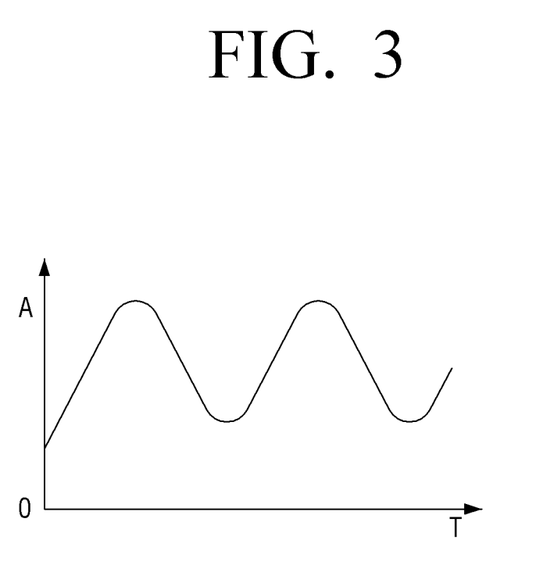
FIG. 3 is a graph illustrating a signal to be output from a sensor portion of the FIG. 2A.

The sensor portion 100 is disposed inside the housing 10. As long as the sensor portion 100 can detect the magnetic field or magnetic force of the rotor 50, the sensor portion 100 may be disposed anywhere inside the housing 10. For example, the sensor portion 100 may be disposed in one of an upper space 16 between the housing cover 12 and the upper rotor 52, a middle space 17 between the upper rotor 52 and the lower rotor 53 of the rotor 50, and a lower space 18 between the bottom surface of the housing body 11 and the lower rotor 53 of the rotor 50. When the rotor 50 rotates, the sensor portion 100 outputs a sine wave as illustrated in FIG. 3. Accordingly, the controller 400 (see FIG. 8) that is provided outside of the stepping motor 1 may determine whether a step-out phenomenon has occurred in the stepping motor 1 by checking the sine wave being outputted from the sensor portion 100. In FIG. 3, the horizontal axis T represents the time, and the vertical axis A represents the amplitude.

Any sensor may be used as the sensor portion 100 as long as the sensor can detect a change in the magnetic force generated during the rotation of the rotor 50. For example, a Hall sensor, a magneto resistive sensor, etc. may be used as the sensor portion 100. If the magneto resistive sensor or the Hall sensor is used as the sensor portion 100, a support portion 101 configured to support the magneto resistive sensor or the Hall sensor may be provided. The support portion 101 may be formed as a printed circuit board on which the magneto resistive sensor or the Hall sensor is disposed and signal lines that are electrically connected to the magneto resistive sensor or the Hall sensor are provided. The support portion 101 is connected to a wire (not illustrated) that is electrically connected to the controller 400 (see FIG. 8). In FIGS. 1 and 2A, the support portion 101 is formed in a rod-shaped printed circuit board. However, this is only one example. The support portion 101 may be formed in various shapes as long as it holds a sensor capable of detecting the magnetic force, such as the magneto resistive sensor or the Hall sensor, in the inner space of the housing 10.

As other example, the sensor portion 100 may use a printed circuit board on which a frequency generating pattern is formed. Here, the frequency generating pattern refers to a pattern for measuring a voltage with a frequency of ½ magnet poles that is generated when the rotor 50 is rotated.

First, a case in which the magneto resistive sensor is used as the sensor portion 100 will be described. The magneto resistive sensor 100 may be disposed above the top end of the rotor 50 inside the housing 10. In detail, referring to FIG. 2A, the magneto resistive sensor 100 may be disposed in the upper space 16 between the housing cover 12 and the top end of the upper rotor 52. At this time, if the magneto resistive sensor 100 is capable of detecting the magnetic force of the rotor 50, the magneto resistive sensor 100 may be placed anywhere in the upper space 16.

However, as an installation position of the magneto resistive sensor 100 in the upper space 16, there is an optimum installation position P1 (see FIG. 2B) where the influence of a current applied to the coils 35 and 45 of the stator assembly 20 against a waveform can be minimized. The optimum installation position P1 of the magneto resistive sensor 100 is, as illustrated in FIG. 2B, an intersection of a center line L3 (see FIG. 2C) bisecting one of the plurality of upper pole pieces 31a on the upper yoke 31 of the upper stator 30, a straight line L1 passing through the center C of the rotor 50, and a tangent line L2 of the outer diameter of the upper rotor 52. Also, the magneto resistive sensor 100 is disposed at a position that is spaced a predetermined distance g (see FIG. 2C) apart from the intersection of the upper yoke 31. For example, the magneto resistive sensor 100, as illustrated in FIG. 2C, may be disposed to be spaced about 0.5 mm from the upper yoke 31 along the center line L3 bisecting the upper pole piece 31a.

Figure 4A:
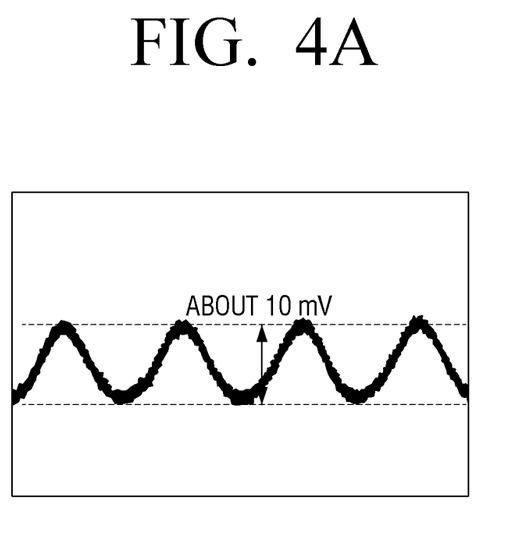
FIG. 4A is a graph illustrating output from a MR sensor disposed at an optimum position in a stepping motor, according to an embodiment of the present disclosure.
Figure 4B:
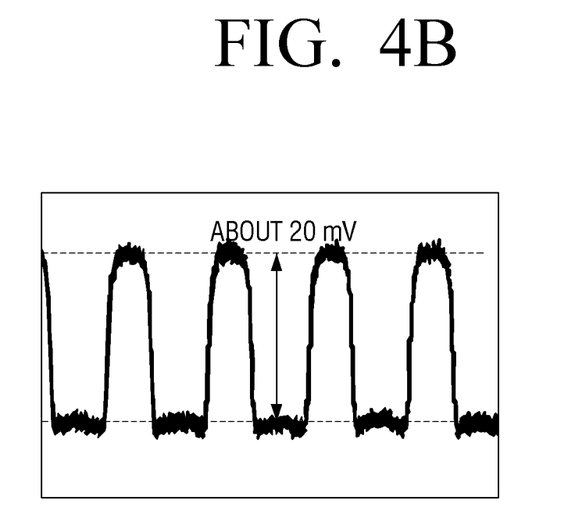
FIG. 4B is a graph illustrating output from a MR sensor disposed at a different position in a stepping motor, according to an embodiment of the present disclosure.

As described above, if the magneto resistive sensor 100 is disposed at the optimum position P1, an influence on which the current flowing through the coils 35 and 45 of the stator assembly 20 exerts on the magneto resistive sensor 100 may be minimized. To confirm this, when the magneto resistive sensor 100 is disposed at a different position, the signal being outputted from the magneto resistive sensor 100 due to the current flowing through the coils 35 and 45 is compared. When the magneto resistive sensor 100 is disposed at the optimum position P1, the signal outputted from the magneto resistive sensor 100 is illustrated in FIG. 4A. Also, when the magneto resistive sensor 100 is disposed at a different position other than the optimum position P1, for example, when the magneto resistive sensor 100 is disposed at a P2 position of FIGS. 2B and 2C, the signal outputted from the magneto resistive sensor 100 is illustrated in FIG. 4B. When comparing the output waveforms illustrated in FIGS. 4A and 4B, the amplitude of the output waveform of FIG. 4A is about 10 mV, and corresponds to approximately ½ of the amplitude (about 20 mV) of the output waveform of FIG. 4B. From this comparison, it can be seen that the influence of the current being applied to the stator assembly 20 may be minimized when the magneto resistive sensor 100 is disposed at the optimum position P1 than when the magneto resistive sensor 100 is disposed at the different position (e.g., position P2). Here, the output waveforms as illustrated in FIGS. 4A and 4B are to measure the output signal of the magneto resistive sensor 100 by applying the current of the sine waveform of 100 Hz, +/−3.75V to the coils 35 and 45 of the stator assembly 20 in a state in which there is no rotor 50.

Figure 5:
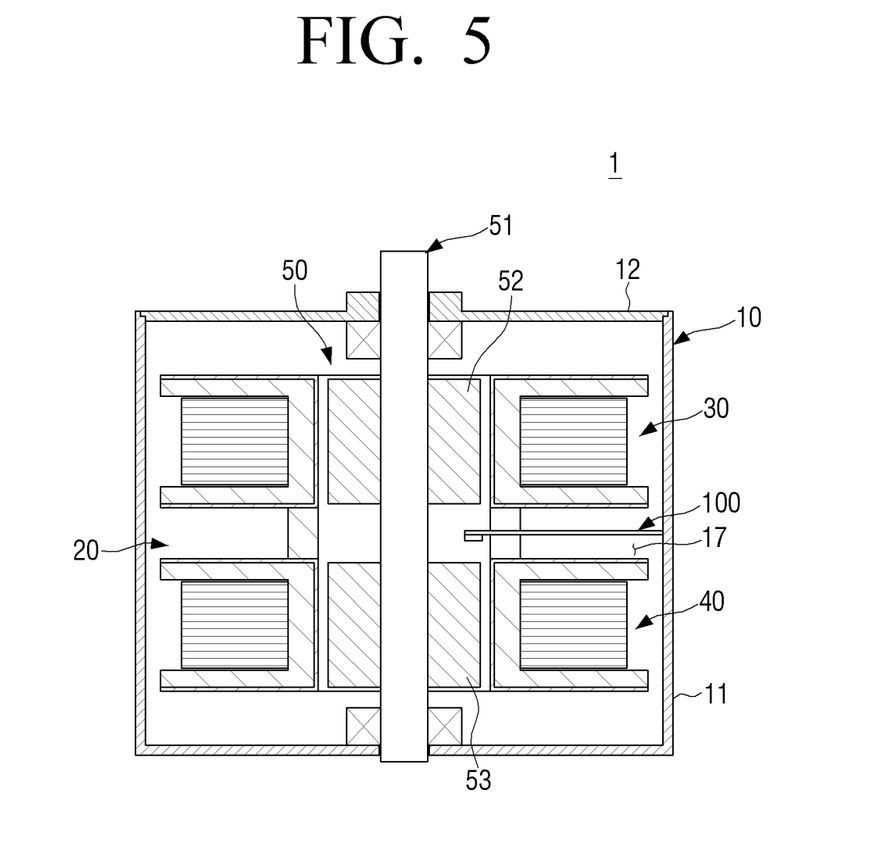
FIG. 5 is a cross-sectional view schematically illustrating a stepping motor, according to another embodiment of the present disclosure.

As another example, the magneto resistive sensor 100 may be disposed in the middle portion of the housing 10, that is, in the middle space 17 between the upper rotor 52 and the lower rotor 53 as illustrated in FIG. 5.

Also, the sensor portion 100 may be configured using a single magneto resistive sensor, or may be composed of two magneto resistive sensors. In this case, the two magneto resistive sensors are arranged with a 90 degree phase difference. If the sensor portion 100 uses two magneto resistive sensors, the controller 400 (see FIG. 8) can detect the rotation direction of the rotor 50 as well as the step-out phenomenon of the stepping motor 1 by using the signals outputted from the two magneto resistive sensors.

As another example, a Hall sensor may be used as the sensor portion 100. The hall sensor may be disposed in the upper space 16 of the housing 10, that is, the space 16 between the housing cover 12 and the top end of the rotor 50, or in the middle space 17 of the housing 10, that is, the space 17 between the upper rotor 52 and the lower rotor 53.

Alternatively, the sensor portion 100 may use a frequency generating pattern.

Figure 6A:
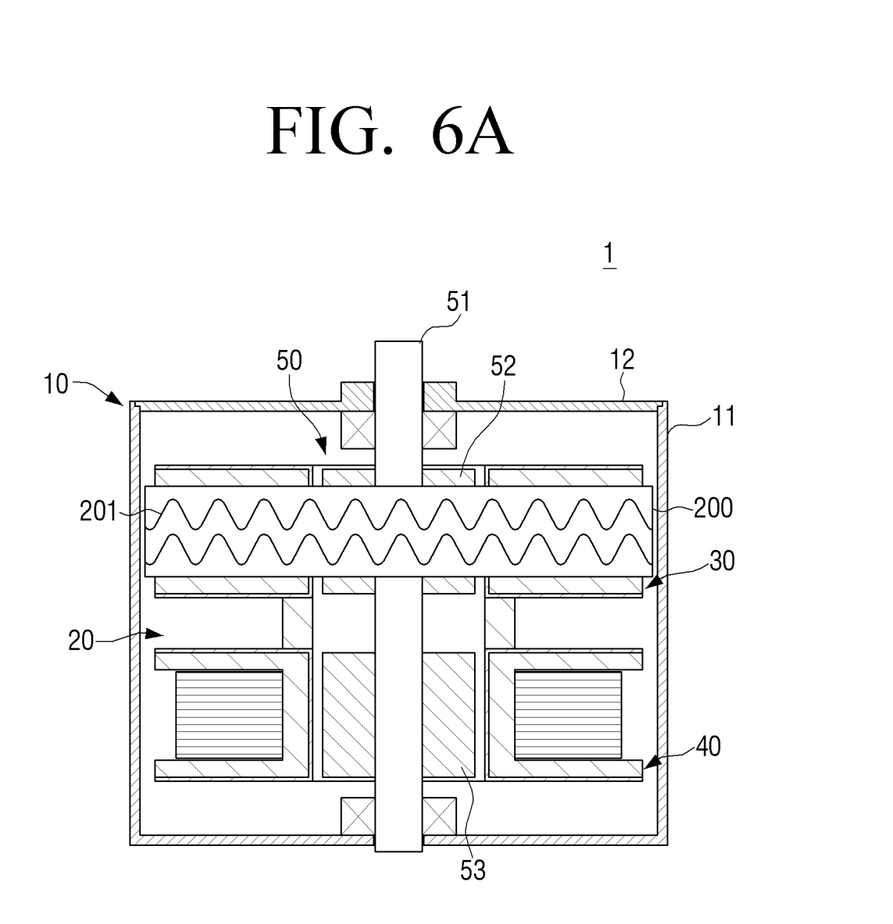
FIG. 6A is a cross-sectional view schematically illustrating a stepping motor, according to another embodiment of the present disclosure.
Figure 6B:
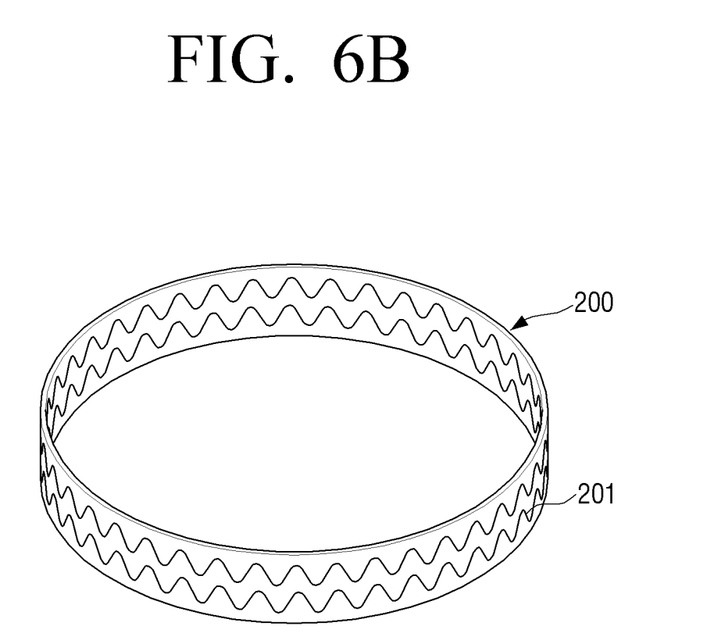
FIG. 6B is a perspective view illustrating an example of a flexible printed circuit board that is used as a sensor portion of the stepping motor of FIG. 6A.

An example of the stepping motor 1 using the frequency generating pattern as the sensor portion 100 is illustrated in FIG. 6A. Referring to FIG. 6A, the frequency generating pattern is arranged to be spaced apart from the outer circumferential surface of the rotor 50 and to surround the rotor 50 so as to detect a change in the magnetic force generated by the rotation of the rotor 50. In detail, as illustrated in FIG. 6B, a frequency generating pattern 201 is formed in a ring shape after the flexible printed circuit board 200. As illustrated in FIG. 6A, the flexible printed circuit board 200 is disposed between the outer circumferential surface of the stator assembly 20 and the inner surface of the housing body 11. Then, when the rotor 50 is rotated, a certain form of signal is outputted from the flexible printed circuit board 200 on which the frequency generating pattern 201 is formed. The flexible printed circuit board 200 may be electrically connected to the controller 400 (see FIG. 8) by wires (not illustrated) so that the controller 400 can receive this output signal.

Figure 7A:
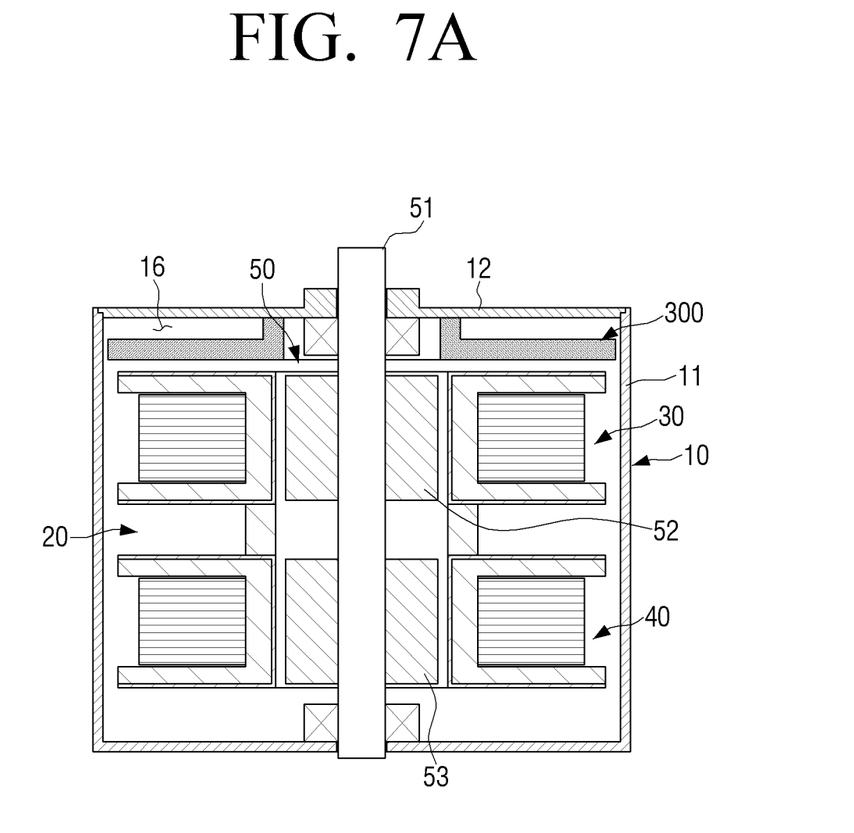
FIG. 7A is a cross-sectional view schematically illustrating a stepping motor, according to another embodiment of the present disclosure.
Figure 7B:
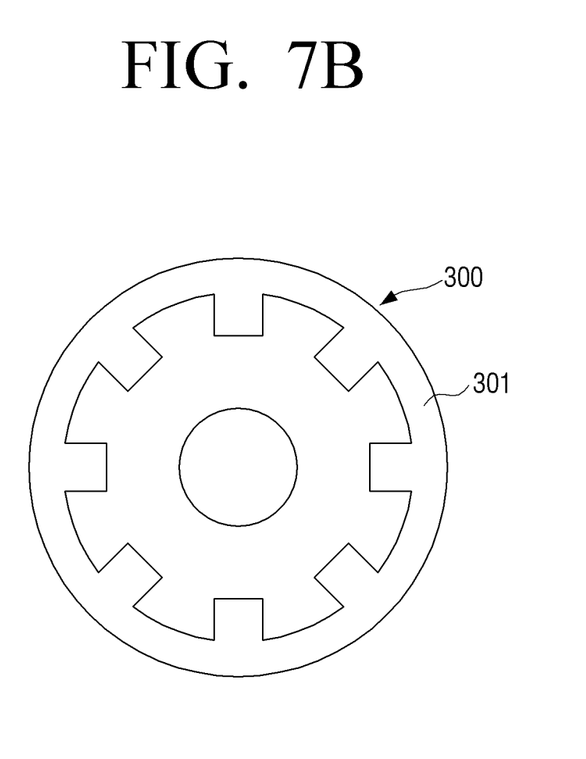
FIG. 7B is a top view illustrating an example of a disc-like printed circuit board that is used as a sensor portion of the stepping motor of FIG. 7A.

Another example of the stepping motor 1 using the frequency generating pattern as the sensor portion 100 is illustrated in FIG. 7A. Referring to FIG. 7A, the frequency generating pattern is arranged to be spaced apart from the top end of the rotor 50 so as to detect a change in the magnetic force generated by the rotation of the rotor 50. In detail, as illustrated in FIG. 7B, a frequency generating pattern 301 is formed on the surface of a disc-like hard printed circuit board (HPCB) 300, and as illustrated in FIG. 7A, the disc-like printed circuit board 300 is disposed between the housing cover 12 and the top end of the rotor 50. Then, when the rotor 50 is rotated, a certain form of signal is outputted from the printed circuit board 300 on which the frequency generating pattern 301 is formed. The printed circuit board 300 may be electrically connected to the controller 400 (see FIG. 8) by wires (not illustrated) so that the controller 400 can receive this output signal.

Since the sensor portion, such as the magneto resistive sensor, can detect the step-out phenomenon of the rotor is disposed inside the housing, there is an advantage that the stepping motor according to an embodiment of the present disclosure having the structure as described above can be manufactured in the same size as or in a size similar to the general stepping motor in which the sensor for detecting the step-out phenomenon is not disposed. Accordingly, there is an advantage that the stepping motor according to an embodiment of the present disclosure has a size smaller than the conventional stepping motor that uses an optical encoder or a magnetic encoder that is disposed outside the conventional stepping motor to detect the step-out phenomenon. Also, since the stepping motor according to an embodiment of the present disclosure does not use the optical encoder or the magnetic encoder but uses the magneto resistive sensor or the Hall sensor having a simple structure, it has a manufacturing cost lower than that of the conventional stepping motor.

Figure 8:
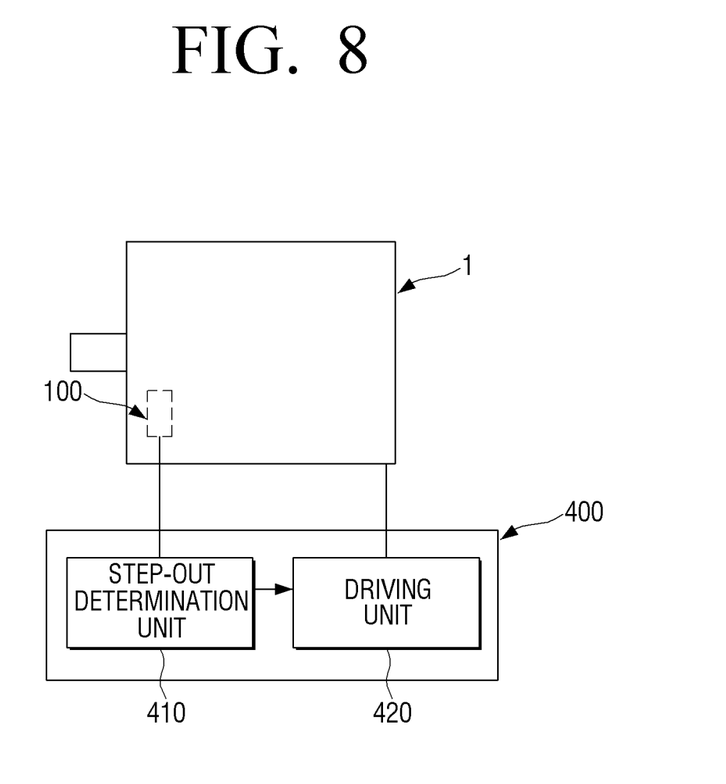
FIG. 8 is a block diagram illustrating a stepping motor system, according to an embodiment of the present disclosure.

The stepping motor 1 according to an embodiment of the present disclosure as described above may be configured in a stepping motor system with the controller 400. FIG. 8 is a block diagram illustrating a stepping motor system, according to an embodiment of the present disclosure.

Referring to FIG. 8, the controller 400 configured to control the stepping motor 1 includes a step-out determination unit 410 to determine whether a step-out phenomenon has occurred by receiving the signal from the sensor portion 100 and a driving unit 420 configured to drive the stepping motor 1.

When the stepping motor 1 is driven by the driving unit 420 and rotates at a constant speed, the sensor portion 100 outputs a signal having a certain pattern by detecting a magnetic field or a magnetic force of the rotor 50. However, when a step-out phenomenon occurs in the stepping motor 1, the sensor portion 100 outputs a deformed signal. For example, when the stepping motor 1 is overloaded, a step-out phenomenon may occur. If the step-out phenomenon occurs, the rotor 50 of the stepping motor 1 cannot rotate at a constant speed so the pattern of the signal outputted from the sensor portion 100 is changed.

The step-out determination unit 410 determines whether the signal being received from the sensor portion 100 is a predetermined constant pattern. If the signal received from the sensor portion 100 is not the constant pattern, the step-out determination unit 410 determines that the stepping motor 1 is stepped-out, and then outputs a stepped-out signal to the driving unit 420. Then, the driving unit 420 raises the driving force of the stepping motor 1 so as to eliminate the step-out phenomenon. For example, the driving unit 420 may eliminate the step-out phenomenon by driving the stepping motor 1 with the current increased to a certain level.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A stepping motor comprising:
   a housing;
   a stator assembly disposed inside the housing;
   a rotor that is rotatably disposed inside the stator assembly and includes a rotation shaft, and opposite ends of the rotation shaft are supported by the housing; and
   a sensor portion that is disposed inside the housing and detects a magnetic field of the rotor,
   wherein the sensor portion is disposed at a position that is spaced apart from the top end of the rotor, and the position is at an intersection of a center line of an upper pole piece of an upper yoke of the stator assembly, a straight line passing through a center of the rotor, and a tangent line of an outer diameter of the rotor.

2. The stepping motor of claim 1, wherein the sensor portion comprises a magneto resistive sensor.

3. The stepping motor of claim 2, wherein the magneto resistive sensor is disposed above a top end of the rotor.

4. The stepping motor of claim 2, wherein:
   the rotor comprises an upper rotor disposed on the rotation shaft and a lower rotor that is spaced apart from the upper rotor and is disposed on the rotation shaft coaxially with the upper rotor; and
   the magneto resistive sensor is disposed in a space between the upper rotor and the lower rotor.

5. The stepping motor of claim 2, wherein the sensor portion further comprises a support portion to support the magneto resistive sensor.

6. The stepping motor of claim 1, wherein the sensor portion comprises two magneto resistive sensors that are arranged with a 90 degree phase difference.

7. The stepping motor of claim 1, wherein the sensor portion comprises a Hall sensor.

8. A stepping motor system comprising:
   a stepping motor, wherein the stepping motor comprises:
   a housing;
   a stator assembly disposed inside the housing;
   a rotor that is rotatably disposed inside the stator assembly and includes a rotation shaft, and opposite ends of the rotation shaft are supported by the housing; and
   a sensor portion that is disposed inside the housing and detects a magnetic field of the rotor, wherein the sensor portion is disposed at a position that is spaced apart from the top end of the rotor, and the position is at an intersection of a center line of an upper pole piece of an upper yoke of the stator assembly, a straight line passing through a center of the rotor, and a tangent line of an outer diameter of the rotor; and a controller configured to control the stepping motor, wherein the controller comprises:

a step-out determination unit configured to determine whether a step-out phenomenon of the stepping motor has occurred by receiving a signal from the sensor portion; and a driving unit configured to drive the stepping motor.

9. The stepping motor system of claim 8, wherein when the step-out determination unit detects a step-out phenomenon of the stepping motor, the controller controls the driving unit to increase a driving force of the stepping motor.

10. The stepping motor system of claim 8, wherein the sensor portion comprises a magneto resistive sensor or a Hall sensor.

11. The stepping motor system of claim 10, wherein the magneto resistive sensor is disposed above the rotor.

12. The stepping motor system of claim 10, wherein:

the rotor comprises an upper rotor disposed on the rotation shaft and a lower rotor that is spaced apart from the upper rotor and is disposed on the rotation shaft coaxially with the upper rotor, and the magneto resistive sensor is disposed in a space between the upper rotor and the lower rotor.

13. The stepping motor system of claim 10, wherein the sensor portion further comprises a support portion to support the magneto resistive sensor.

14. The stepping motor system of claim 8, wherein the sensor portion comprises two magneto resistive sensors that are arranged with a 90 degree phase difference.

* * * * *